(12) United States Patent
Oldani et al.

(10) Patent No.: US 12,072,740 B2
(45) Date of Patent: Aug. 27, 2024

(54) KICKSTAND FOR FOLDABLE COMPUTING DEVICE

(71) Applicant: Microsoft Technology Licensing, LLC, Redmond, WA (US)

(72) Inventors: Michael Gordon Oldani, Redmond, WA (US); Benjamin Alexander Davids, Shoreline, WA (US); Daniel Clark Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 18/069,180

(22) Filed: Dec. 20, 2022

(65) Prior Publication Data

US 2024/0201747 A1    Jun. 20, 2024

(51) Int. Cl.
*G06F 1/16* (2006.01)
(52) U.S. Cl.
CPC ............ *G06F 1/166* (2013.01); *G06F 1/1616* (2013.01); *G06F 1/1679* (2013.01)
(58) Field of Classification Search
CPC ....... G06F 1/166; G06F 1/1616; G06F 1/1679
See application file for complete search history.

(56) References Cited

U.S. PATENT DOCUMENTS

| 10,606,314 | B1* | 3/2020 | Takano | F16M 11/2021 |
| 2011/0031287 | A1* | 2/2011 | Le Gette | F16M 11/10 248/65 |
| 2018/0052498 | A1* | 2/2018 | Nakagaki | G06F 1/166 |
| 2019/0107245 | A1 | 4/2019 | Torres | |
| 2019/0278324 | A1* | 9/2019 | Yoon | G06F 1/1616 |
| 2019/0335258 | A1* | 10/2019 | Vaturi | H04R 29/001 |
| 2021/0112673 | A1* | 4/2021 | Huttula | G06F 1/1641 |
| 2021/0311523 | A1* | 10/2021 | Bai | H05K 5/0226 |
| 2022/0197352 | A1 | 6/2022 | Nishi | |

(Continued)

FOREIGN PATENT DOCUMENTS

| CN | 215734398 U | 2/2022 |
| CN | 217445401 U | 9/2022 |

(Continued)

OTHER PUBLICATIONS

International Search Report and Written Opinion received for PCT Application No. PCT/US2023/035757 mailed on Jan. 26, 2024, 13 pages.

(Continued)

*Primary Examiner* — Amy J. Sterling
(74) *Attorney, Agent, or Firm* — Alleman Hall & Tuttle LLP

(57) ABSTRACT

A kickstand assembly comprises a backplate including a backplate deploy magnet having a first magnetic pole orientation. An upper kickstand plate is slidably connected to the backplate, and a lower kickstand plate is rotatably coupled to the upper kickstand plate. The lower kickstand plate includes a closing magnet having a second magnetic pole orientation that attracts the backplate deploy magnet, and an opening magnet laterally spaced from the closing magnet and having the first magnetic pole orientation that repels the backplate deploy magnet to cause the lower kickstand plate to rotate about the upper kickstand plate when the upper kickstand plate is laterally translated relative to the backplate.

20 Claims, 12 Drawing Sheets

(56) References Cited

U.S. PATENT DOCUMENTS

| | | | | |
|---|---|---|---|---|
| 2022/0413550 | A1* | 12/2022 | Huang | G06F 1/1607 |
| 2023/0044946 | A1* | 2/2023 | Watamura | G06F 1/1626 |
| 2023/0119798 | A1* | 4/2023 | Atom | G06F 1/1626 |
| | | | | 361/679.09 |
| 2023/0195176 | A1* | 6/2023 | Perelli | G06F 1/166 |
| | | | | 361/679.01 |
| 2024/0004426 | A1* | 1/2024 | Yamada | H10K 50/11 |

FOREIGN PATENT DOCUMENTS

| | | |
|---|---|---|
| CN | 115552353 A | 12/2022 |
| JP | 2020198605 A | 12/2020 |
| KR | 20210094923 A | 7/2021 |
| WO | 2021171017 A1 | 9/2021 |

OTHER PUBLICATIONS

International Search Report and Written Opinion received for PCT Application No. PCT/US2023/036323 mailed on Jan. 26, 2024, 14 pages.

"DailyObjects Finger Grip/Mobile Stand for Smartphones—Red Skate Slider Phone Holder", Retrieved From: "https://www.amazon.in/DailyObjects-Finger-Mobile-Stand-Smartphones/dp/B09P86SPVH", Nov. 10, 2022, 5 Pages.

"Galaxy Z Fold4 Camera Protection Camshield Pro Case", Retrieved From: "https://shopbasic.in/products/galaxy-z-fold4-camera-protection-camshield-pro-case", Nov. 10, 2022, 8 Pages.

"Galaxy Z Fold4 Luxury Colored Strap Glass Flip Case", Retrieved From: "https://shopbasic.in/products/galaxy-z-fold4-luxury-colored-strap-glass-flip-case?variant=43450649739519", Nov. 10, 2022, 8 Pages.

"Samsung Galaxy Z Fold4 GKK Integrated Magnetic Armor Flip Phone Case With Pen Box(Grey)", Retrieved From: "https://bonzi.co.in/products/for-samsung-galaxy-z-fold4-gkk-integrated-magnetic-armor-flip-phone-case-with-pen-boxgrey", Nov. 10, 2022, 13 Pages.

"Tizum Z117—Universal Foldable Handheld Mobile Holder Kickstand", Retrieved From: Https://www.amazon.in/Universal-Foldable-Handheld-Kickstand-Horizontal/dp/B09RQTF9TN/ref=pd_lpo_2?Pd_rd_w=mgnkl&content-id=amzn1.sym.66c58da2-d957-4807-8106-b37631bfb8ca&pf_rd_p=66c58da2-d957-4807-8106-b37631bfb8ca&pf_rd_r=CY1NF1CHPVZPPGRHVTW3&pd_rd_wg=QNS9v&pd_rd_r=20499deb-6d61-4a45-949d-f64a9d62a257&pd_rd_i=B09RQTF9TN&psc=1, Jan. 24, 2023, 4 Pages.

* cited by examiner

Sliding an upper kickstand plate of the kickstand assembly in a lateral direction relative to the backplate to cause a backplate deploy magnet in the backplate to repel an opening magnet in the lower kickstand plate and cause the lower kickstand plate to rotate about a connection with the upper kickstand plate 402

KICKSTAND FOR FOLDABLE COMPUTING DEVICE

BACKGROUND

Foldable computing devices can be utilized in a variety of positions and orientations for different use cases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed and further described below that relate kickstand assemblies for foldable computing devices. In one example, a kickstand assembly for a foldable computing device comprises a backplate comprising a backplate deploy magnet having a first magnetic pole orientation. An upper kickstand plate is slidably connected to the backplate, and a lower kickstand plate is rotatably coupled to the upper kickstand plate. The lower kickstand plate comprises a closing magnet having a second magnetic pole orientation that attracts the first magnetic pole orientation of the backplate deploy magnet. The lower kickstand plate also includes an opening magnet laterally spaced from the closing magnet and having the first magnetic pole orientation that repels the backplate deploy magnet to cause the lower kickstand plate to rotate about the upper kickstand plate when the upper kickstand plate is laterally translated relative to the backplate.

Another example provides a method of deploying a lower kickstand plate of a kickstand assembly that is attached to a foldable computing. The method comprises sliding an upper kickstand plate of the kickstand assembly in a lateral direction relative to the backplate to cause a backplate deploy magnet in the backplate to repel an opening magnet in the lower kickstand plate and cause the lower kickstand plate to rotate about a connection with the upper kickstand plate.

DETAILED DESCRIPTION

Figure 1:
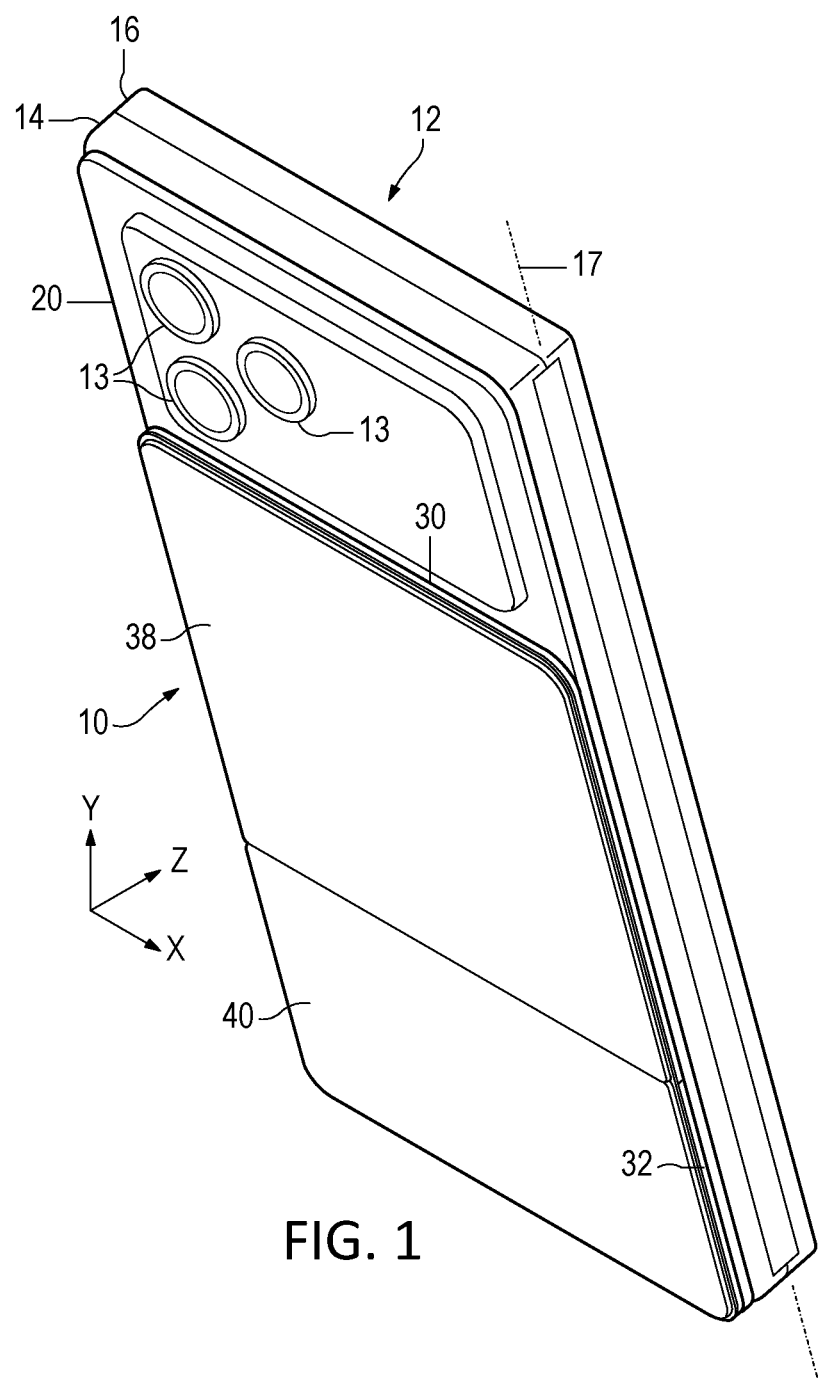
FIG. 1 shows one example of a kickstand assembly mounted to a foldable computing device according to examples of the present disclosure.

Some foldable computing devices include two frames or other structures that are rotatably coupled at a hinge. Some of these devices utilize a flexible display that can deform as display support frames beneath the flexible display are folded. In some of these devices, hinges couple two display supports for folding 180 degrees from an end-to-end (or open) orientation in which the flexible display is substantially planar to a face-to-face (or closed) orientation in which one portion of the flexible display is facing the opposing portion. In other examples the two display supports can fold substantially 360 degrees from a back-to-back orientation in which the flexible display wraps around the folded supports to the face-to-face orientation.

In other foldable computing devices, two frames each support separate displays that can be folded between open and closed orientations. Other foldable devices can have a single display affixed or integral to one of the frames. In any of these devices, one or more other components can be attached to or integral with the frames, such as a touchpad, button(s), camera(s), keyboard, etc.

As noted above, foldable computing devices can be utilized by an end user in a variety of positions and orientations for different use cases. In some examples, a user can desire to use a foldable computing device in an unfolded or end-to-end configuration with the device positioned on a surface at a raised angle to the surface. For example, a user may desire to read a book or scroll through messages while resting the device on a table at an angle. In other examples, a user can desire to utilize a foldable computing device in a folded configuration with the device similarly positioned on a surface at an angle, such as for taking a selfie or video. In many of these cases, the user is required to prop the device at an angle against another object on the surface, which can be an inconvenient and unstable setup.

Accordingly, the present disclosure describes kickstand assemblies for a foldable computing device that automatically deploy a kickstand when a user laterally slides a portion of the assembly to a deployed position. As described in more detail below, kickstand assemblies of the present disclosure enable a user to easily deploy a lower kickstand plate while shifting the plate laterally to a position more aligned with the center of gravity of the two frames in an end-to-end orientation. Additionally, magnets releasably secure the lower kickstand plate to a backplate when the lower kickstand plate is in a home position to prevent the plate from undesirably deploying.

FIGS. 1-8 show one example of a kickstand assembly 10 according to aspects of the present disclosure. In the present example and as described in more detail below, the kickstand assembly 10 is removably attached to a foldable computing device 12 that includes a first frame 14 rotatably coupled to a second frame 16 via a device hinge (not shown) along a device folding axis 17. The foldable computing device 12 includes a flexible display (not shown) that is supported by the first frame 14 and the second frame 16 on the opposing sides of these frames as viewed in FIGS. 1 and 2. The first frame 14 and the second frame 16 may be rotated between an end-to-end (open) orientation (see FIG. 2) and a face-to-face (closed) orientation (see FIG. 1) in which the flexible display is folded in the interior of the device.

It will be appreciated that the foldable computing device 12 is merely one example of a wide variety of foldable devices with which kickstand assemblies of the present disclosure may be utilized. In other examples, kickstand assemblies of the present disclosure can be utilized with numerous other foldable computing devices having different form factors, capabilities, components, and/or other features. Examples include but are not limited to smart phones, hand-held computing devices, tablets, laptops, and wearable computing devices.

Figure 2:
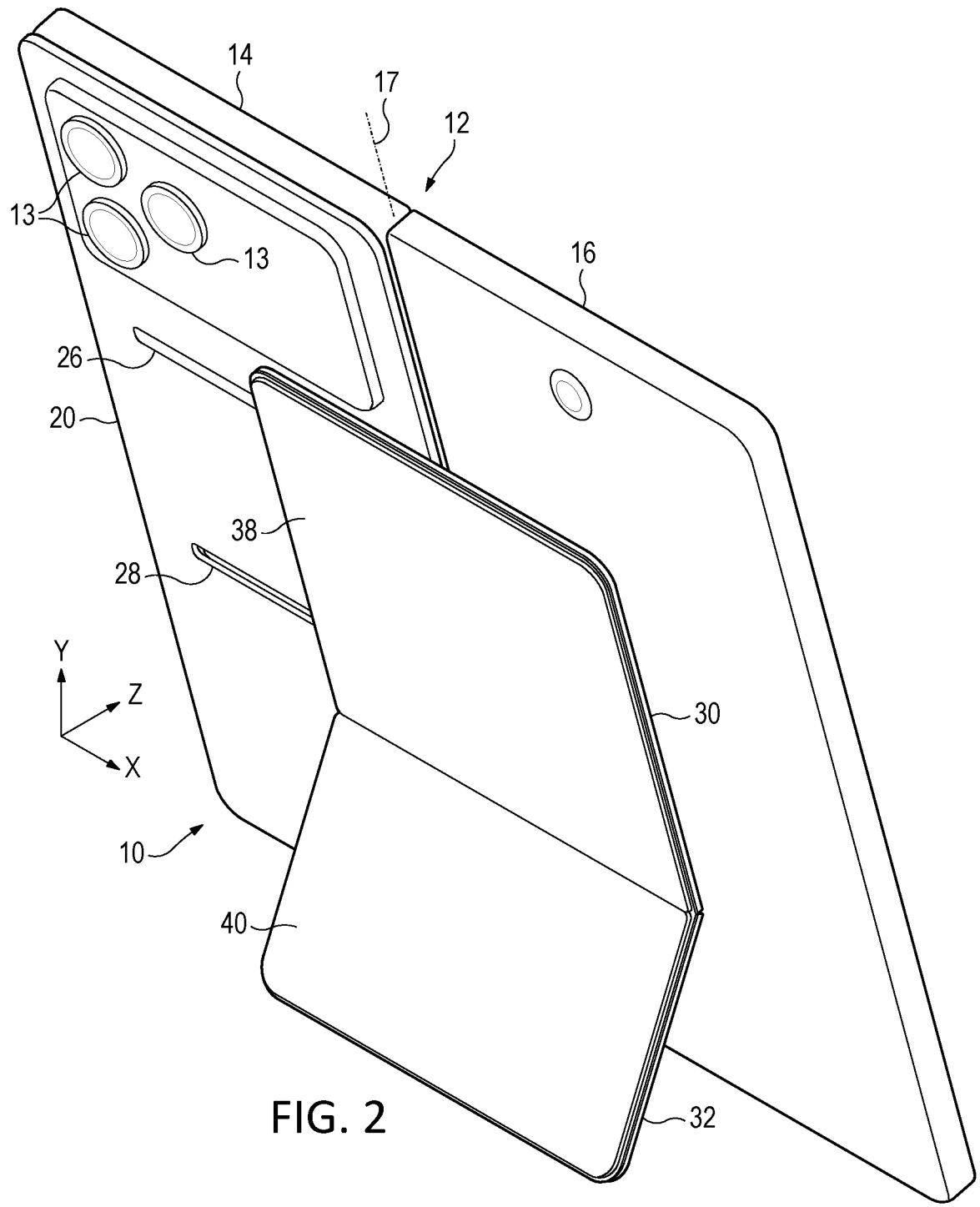
FIG. 2 shows the kickstand assembly in a deployed position.
Figure 3:
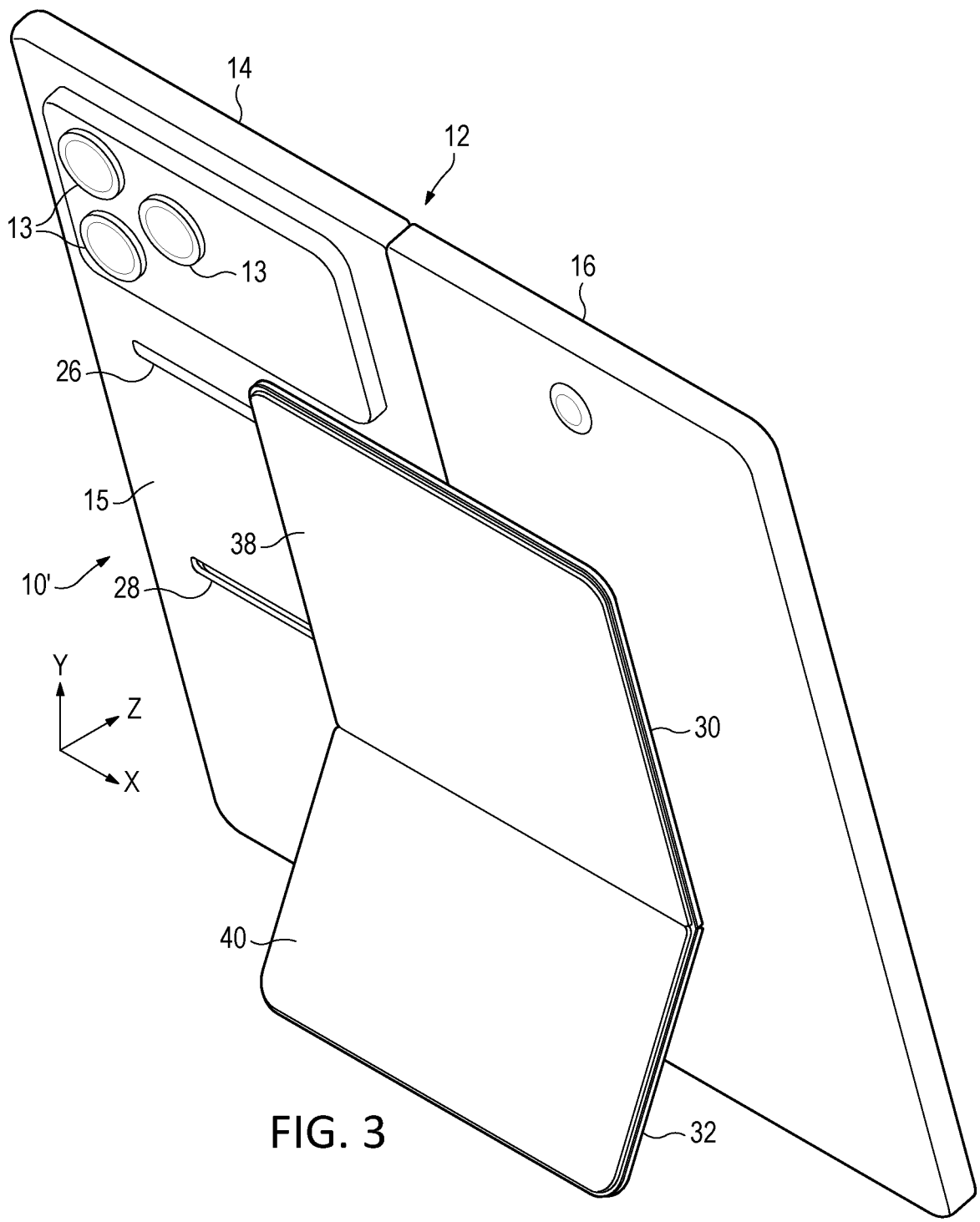
FIG. 3 shows another example of a kickstand assembly integrated into one of the frames of the foldable computing device according to examples of the present disclosure.
Figure 8:
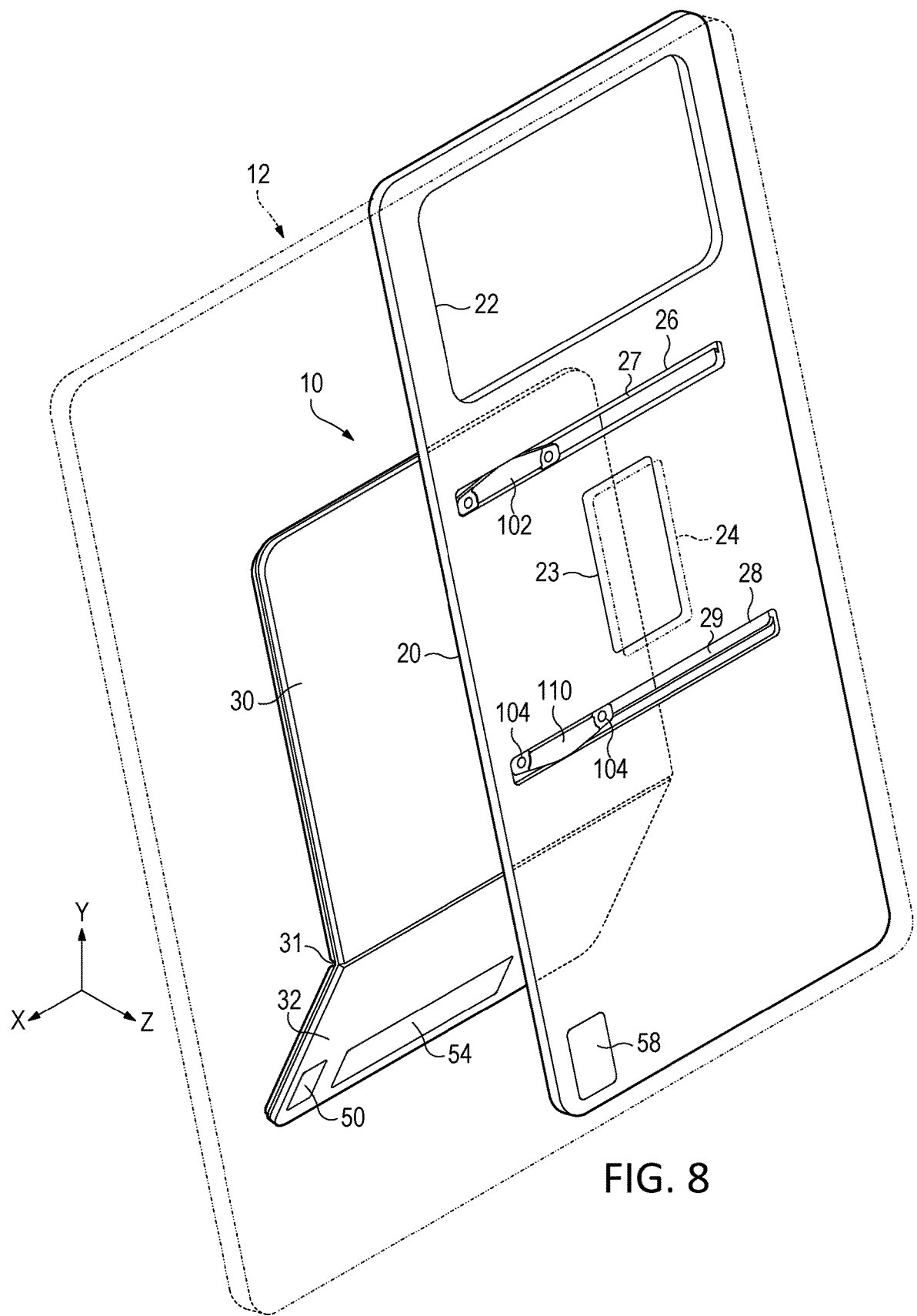
FIG. 8 shows another view of the kickstand assembly in a deployed position.

In the present example and with reference to FIGS. 1, 2, and 8, the kickstand assembly 10 comprises a backplate 20 that includes a window 22. In this example, when the backplate 20 is installed onto the rear face 15 of the first frame 14 as shown in FIGS. 1 and 2, a plurality of camera lenses 13 protruding from the rear face of the first frame 14 are located within the window 22. In this example, and in one potential advantage of the present disclosure, the backplate 20 is a separate structure that is removably attached to the foldable computing device 12. More particularly, in this example and with reference to FIGS. 4 and 8, the backplate comprises a backplate accessory magnet 23 that is configured to attract a corresponding frame accessory magnet 24 located in the first frame 14 of the foldable computing device 12. Advantageously, this configuration allows a user to conveniently and easily attach or detach the kickstand assembly 10 from the foldable computing device 12.

In other examples, the backplate accessory magnet 23 can be positioned in a variety of other locations in the backplate 20 to correspond with a location of a corresponding frame accessory magnet 24 in the first frame of the foldable computing device. Additionally or alternatively, other examples of kickstand assemblies of the present disclosure can include one or more additional backplate accessory magnet(s) that are located and configured to attract one or more additional corresponding frame accessory magnet(s) in a frame of a foldable computing device.

In other examples, kickstand assemblies of the present disclosure are integrated into one of the frames of the foldable computing device (i.e., not removable). In one example and with reference now to FIG. 3, the backplate of the kickstand assembly 10' is also a rear face 15 of the first frame 14 of the foldable computing device 12. In this example and as described in more detail below, the kickstand assembly 10' translates relative to the first frame 14 within first and second slots 26, 28 located in the rear face 15 of the first frame.

With reference now to FIGS. 1, 2, 4, and 8, as described further below and in another potential advantage of the present disclosure, the kickstand assembly 10 includes magnets that automatically deploy a lower kickstand plate 32 when a user laterally slides the assembly from a home position (shown in FIG. 1) to a deployed position (shown in FIGS. 2 and 8). Advantageously, in this manner the kickstand assembly 10 enables a user to easily and conveniently deploy the lower kickstand plate by simply laterally sliding an upper kickstand plate relative to the underlying backplate 20.

Additionally, and in another potential advantage of the present disclosure, in addition to automatically deploying the lower kickstand plate 32, the lateral movement of the kickstand assembly 10 also repositions the kickstand plate near the middle of the first frame 14 and second frame 16 in their end-to-end (open) orientation as shown in FIGS. 2 and 8. Advantageously, by repositioning the middle of the kickstand assembly 10 at or near the folding axis 17 of the two frames, the kickstand assembly is positioned to provide a centered, stable support surface against which the two frames are supported. Accordingly, this stable positioning allows the user to place the frames on a horizontal surface, such as a table, at a stable and convenient angle for the user.

Figure 7:
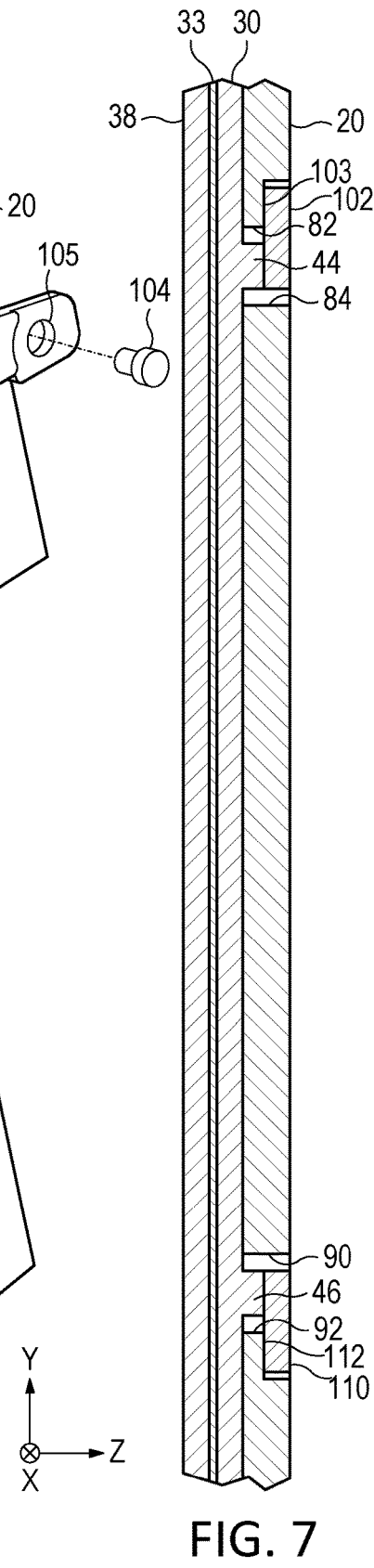
FIG. 7 shows a cross-section view taken along lines 7-7 in FIG. 4.

In the present example and with reference to FIGS. 2 and 8, the kickstand assembly 10 comprises an upper kickstand plate 30 that is rotatably coupled to a lower kickstand plate 32. In this example, the upper kickstand plate 30 and lower kickstand plate 32 are rotatably coupled via a living hinge 31. With reference also to FIG. 7, in this example the living hinge 31 comprises a flexible substrate 33, such as a polyester film, to which the upper kickstand plate 30 and lower kickstand plate 32 are affixed, such as via an adhesive. In other examples, a variety of other materials and structures can be utilized to rotatably couple the upper kickstand plate 30 to the lower kickstand plate 32.

In the present example, an upper outer panel 38 is affixed to the upper portion of the flexible substrate 33 overlying the upper kickstand plate 30. Similarly, a lower outer panel 40 is affixed to a lower portion of the flexible substrate 33 overlying the lower kickstand plate 32.

As noted above, the upper kickstand plate 30 is slidably connected to the backplate 20. More particularly, in this example the backplate 20 comprises a first slot 26 and a second slot 28 that are parallel to one another and spaced apart in the y-axis direction. With reference to FIGS. 4, 5, 6, and 8, the upper kickstand plate 30 comprises a first slider 44 that protrudes from the plate and is slidably received in the first slot 26 of the backplate 20. With reference also to FIG. 7, the upper kickstand plate 30 also comprises a second slider 46 that protrudes from the upper kickstand plate and is slidably received in the second slot 28 of the backplate 20. The first slider 44 and second slider 46 are spaced apart in the y-axis direction by the same distance as the first slot 26 and the second slot 28. Advantageously and as described further below, this configuration enables the upper kickstand plate 30 (and attached lower kickstand plate 32) to slide laterally in the x-axis direction relative to the backplate 20 and first frame 14 of the foldable computing device 12. In other examples, kickstand assemblies of the present disclosure can include three, four, or more pairs of sliders and corresponding slots as described herein.

In the present example the first slider 44 and second slider 46 are integrally fabricated with the upper kickstand plate 30, such as via additive manufacturing techniques. Advantageously, integrally fabricating the sliders with the upper kickstand plate 30 enables more precise dimensional tolerancing and greater accuracy in positioning the sliders on the upper kickstand plate to mate with the corresponding first slot 26 and second slot 28 in the backplate 20. In other examples, kickstand assemblies of the present disclosure utilize a first slider 44 and second slider 46 that are separate components affixed to the upper kickstand plate 30. For example, the first slider 44 and second slider 46 can be affixed to the upper kickstand plate 30 via pins extending through apertures in each end of each slider.

Figure 5:
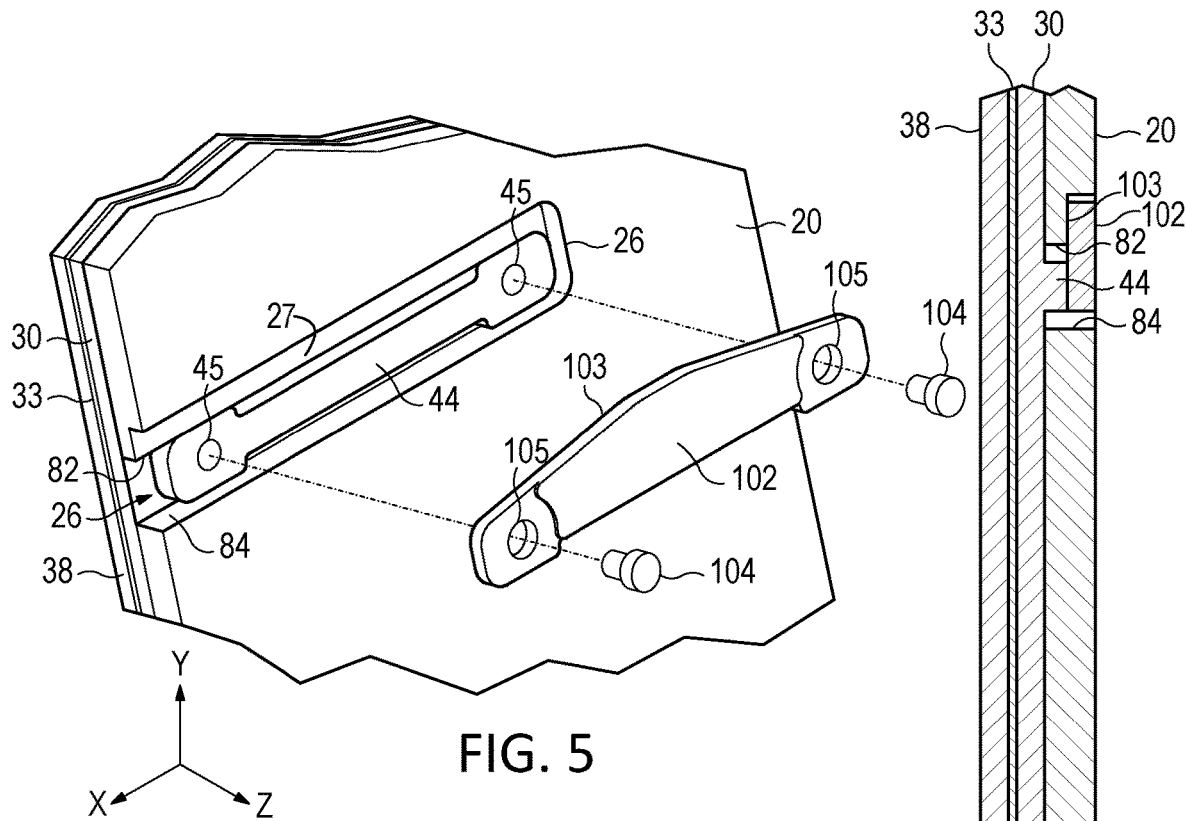
FIG. 5 shows an exploded partial view of a portion of the kickstand assembly of FIG. 1.
Figure 6:
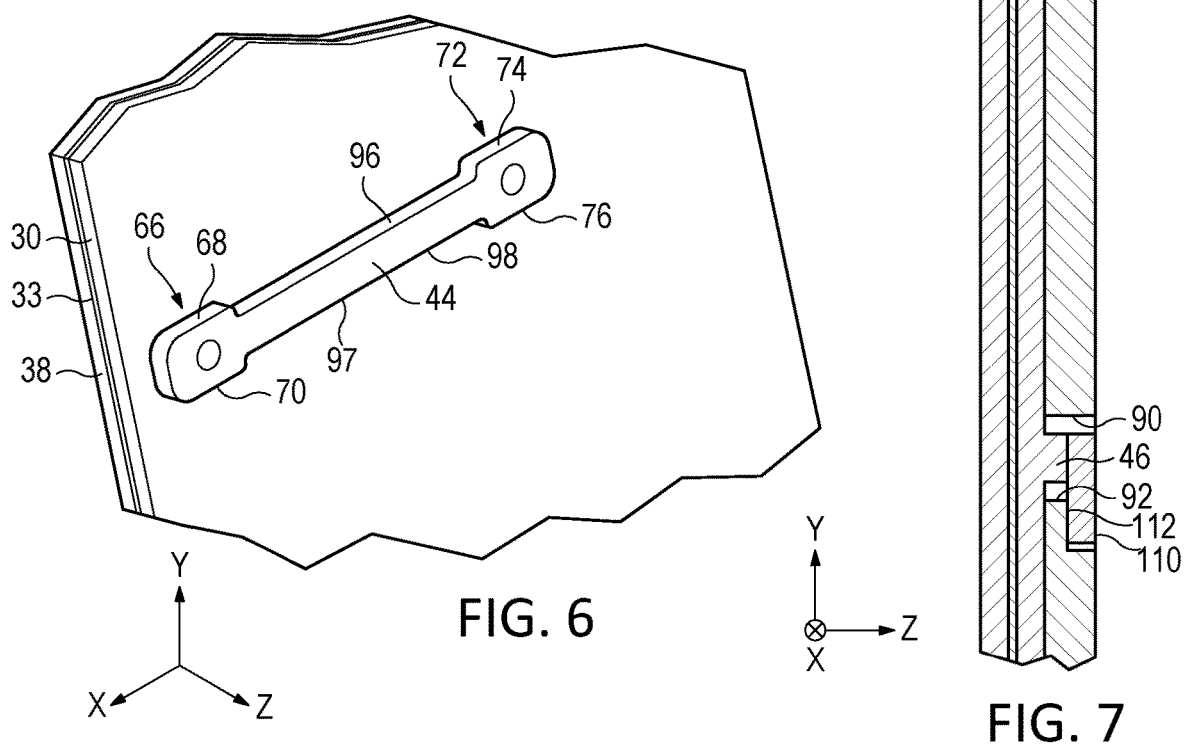
FIG. 6 shows a view of the slider and upper kickstand plate of the kickstand assembly of FIG. 5.

With reference now to FIGS. 5 and 6, an example structure of the first slider 44 is now provided. In the present example, the second slider 46 has the same shape and structure as the first slider 44. As shown in FIG. 6, the first slider 44 comprises an elongated member 64 that comprises a first end 66 comprising a first slider upper bearing surface 68 and a first slider lower bearing surface 70, and a second end 72 comprising a second slider upper bearing surface 74 and a second slider lower bearing surface 76. Between the first slider upper bearing surface 68 and the second slider upper bearing surface 74 is an upper recessed relief surface 96. Similarly, between the first slider lower bearing surface 70 and the second slider lower bearing surface 76 is a lower recessed relief surface 97. In one potential advantage of the present configuration and as described further below, by spacing the upper and lower bearing surfaces between elongated recessed relief surfaces, the first slider 44 (and second slider 46) embody spaced-apart slider surface areas that contact upper and lower slot surfaces at laterally separated locations within the slot. Advantageously, such spacings help reduce torsional forces exerted on the sliders when the upper kickstand plate 30 is translated, which correspondingly reduces the potential for the sliders to bind or jam within the slots.

As best seen in FIGS. 5-7, in this example the first slider upper bearing surface 68 and the second slider upper bearing surface 74 are in sliding contact with a first slot upper bearing surface 82 of the first slot 26. In a similar manner, the first slider lower bearing surface 70 and the second slider lower bearing surface 76 are in sliding contact with a first slot lower bearing surface 84 of the first slot 26. Accordingly, and in one potential advantage of the present disclosure, this configuration constrains the first slider 44, second slider 46, and upper kickstand plate 30 to translate back and forth in the x-axis direction to enable the user to easily move the kickstand assembly and automatically deploy the lower kickstand plate 32 (as described further below).

In other examples, the distance between the first slot upper bearing surface 82 and the first slot lower bearing surface 84 is slightly greater than the distance between the first slider upper bearing surface 68 and the first slider lower bearing surface 70, and similarly slightly greater than the distance between the second slider upper bearing surface 74 and the second slider lower bearing surface 76. In one potential advantage of these examples, the first slider 44 and second slider 46 have a slight freedom of movement in the y-axis direction to provide for lower frictional engagement and reduced possibilities of binding during movement in the x-axis direction.

To retain the first slider 44 within the first slot 26, a first capture member 102 is affixed to the first slider 44. In this example, pins 104 extend through apertures 105 in the capture member 102 and into apertures 45 in the first slider 44 to retain the first slider within the first slot 26. With reference to FIGS. 5 and 7, a rear face 103 of the first capture member 102 rests against a first shelf 27 within the first slot 26. Advantageously, in this configuration the first capture member 102 retains the first slider 44 within the first slot 26, which correspondingly retains and enables the kickstand assembly 10 to translate laterally with respect to the backplate 20.

Figure 4:
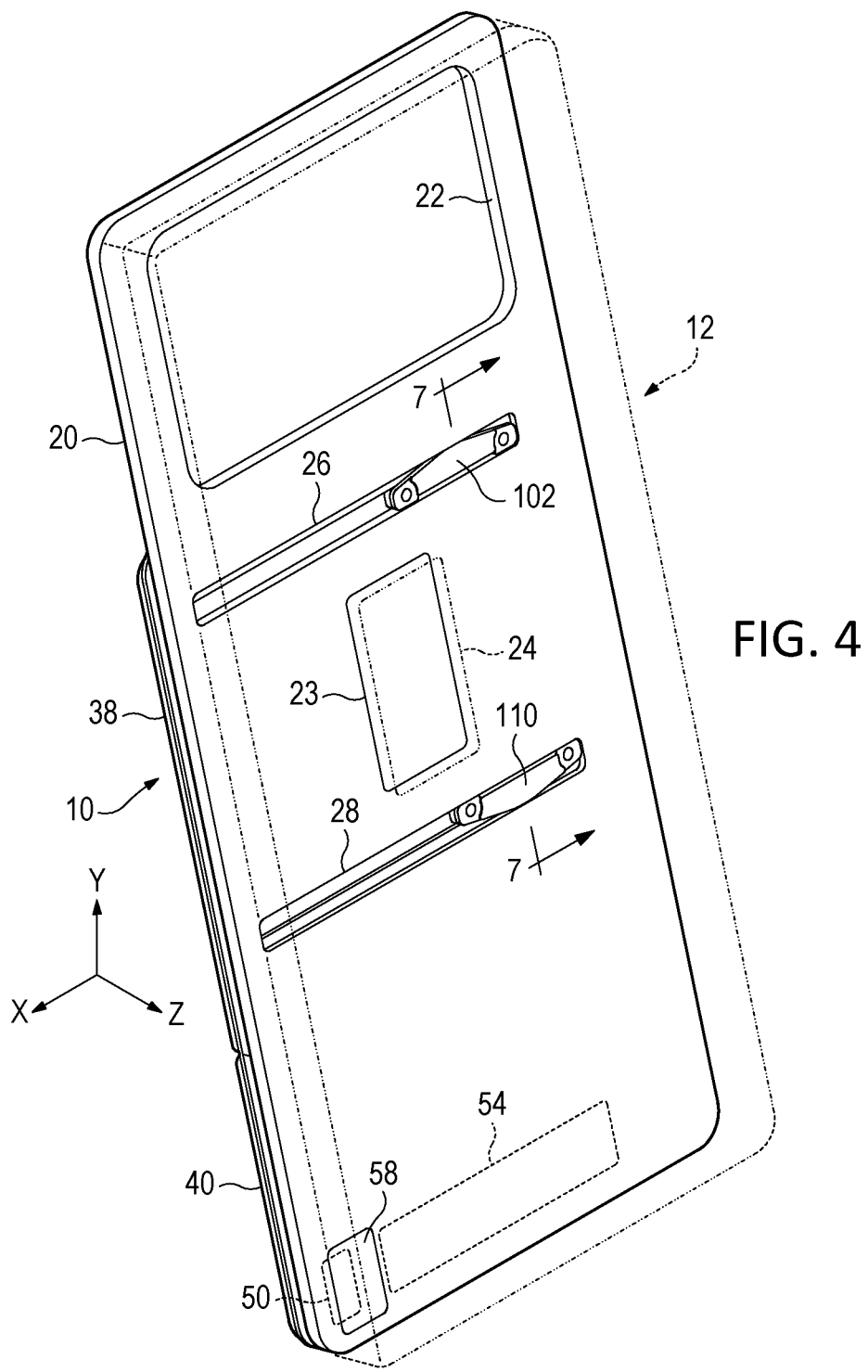
FIG. 4 shows another view of the kickstand assembly of FIG. 1.

With reference to FIGS. 4, 7, and 8, the second slider 46 is similarly retained within the second slot 28 by a second capture member 110 via pins 104. A rear face 112 of the second capture member 110 rests against a second shelf 29 within the second slot 28. As described above, the second capture member 110 retains the second slider 46 within the second slot 28, which correspondingly retains and enables the kickstand assembly 10 to translate laterally with respect to the backplate 20.

As noted above, and in another potential advantage of the present disclosure, magnets automatically deploy the lower kickstand plate 32 when a user laterally slides the assembly from the home position of FIG. 1 to the deployed position as shown in FIGS. 2 and 8. More particularly and with reference to FIGS. 4 and 8, in this example the backplate 20 includes a backplate deploy magnet 58 that has a first magnetic pole orientation. The lower kickstand plate 32 includes a closing magnet 50 that has a second magnetic pole orientation that attracts the first magnetic pole orientation of the backplate deploy magnet 58.

Accordingly, as shown in FIG. 4 and in another potential advantage of the present disclosure, the closing magnet 50 of the lower kickstand plate 32 overlies and magnetically attracts the backplate deploy magnet 58 in the backplate 20 to releasably secure the lower kickstand plate to the backplate when the lower kickstand plate is in the home position relative to the backplate. In this example, the home position corresponds to the position of the kickstand assembly 10 in FIGS. 1 and 4, with the lower kickstand plate 32 parallel with the upper kickstand plate 30 (i.e., not deployed). Advantageously, this configuration holds the lower kickstand plate 32 flush with the backplate surface when the lower kickstand plate is in the home position. Additionally and in some examples, while in this home position the lower kickstand plate 32 can be manually deployed by a user grasping and pulling the lower kickstand plate outwardly to overcome the magnetic attractions between the closing magnet 50 and the backplate deploy magnet 58.

As shown in FIGS. 4 and 8, the lower kickstand plate 32 also includes an opening magnet 54 spaced laterally from the closing magnet 50. The opening magnet 54 has the first magnetic pole orientation of the backplate deploy magnet 58. In this manner, when the upper kickstand plate 30 is laterally translated in the positive x-axis direction relative to the backplate 20 from the home position toward the deployed position of FIGS. 2 and 8, the backplate deploy magnet 58 repels the opening magnet 54 to cause the lower kickstand plate 32 to rotate about the upper kickstand plate into the angled, deployed position as shown in FIGS. 2 and 8. Accordingly, and in another potential advantage of the present disclosure, this configuration automatically deploys the lower kickstand plate 32 when the upper kickstand plate 30 is laterally translated away from the home position in the positive x-axis direction. It follows that this configuration both automatically deploys the lower kickstand plate 32 and repositions the kickstand plate to a position more aligned with the center of gravity of the two frames in the end-to-end orientation, thereby providing a more stable and secure angled positioning of the foldable computing device 12.

In other examples, kickstand assemblies of the present disclosure utilize slots in the upper kickstand plate and sliders protruding from the backplate. With reference now to FIGS. 9-13, in one example a kickstand assembly 200 comprises a backplate 220 that includes a first slider 244 and a second slider 246 protruding from the backplate. The first slider 244 is slidably received in a first slot 226 located in the upper kickstand plate 230. Similarly, the second slider 246 is slidably received in a second slot 228 located in the upper kickstand plate 230. The first slider 244 and second slider 246 are spaced apart in the y-axis direction by the same distance as the first slot 226 and the second slot 228. Advantageously and like the configuration described above, this configuration enables the upper kickstand plate 230 and lower kickstand plate 232 to slide laterally in the x-axis direction relative to the backplate 20 and first frame 14 of the foldable computing device 12. In other examples of this configuration, kickstand assemblies of the present disclosure can include three, four, or more pairs of sliders and corresponding slots as described herein.

In the present example the first slider 244 and second slider 246 are integrally fabricated with the backplate 220, such as via additive manufacturing techniques. Advantageously and as noted above, integrally fabricating the sliders with the backplate 220 enables more precise dimensional tolerances and greater accuracy in positioning the sliders on the backplate to mate with the corresponding first slot 226 and second slot 228 in the upper kickstand plate 230. In other examples, kickstand assemblies of the present disclosure utilize a first slider 244 and second slider 246 that are separate components affixed to the backplate 220.

In this example, and in one potential advantage as described above, the backplate 220 is a separate structure that is removably attached to the foldable computing device 12. More particularly, in this example and with reference to FIGS. 9 and 10, the backplate 220 comprises a backplate accessory magnet 223 that is configured to attract a corresponding frame accessory magnet 224 located in the first frame 14 of the foldable computing device 12. Advantageously, this configuration allows a user to conveniently and easily attach or detach the kickstand assembly 200 from the foldable computing device 12.

In other examples, the backplate accessory magnet 223 can be positioned in a variety of other locations in the backplate 220 to correspond with a location of a corresponding frame accessory magnet 224 in the first frame of the foldable computing device. Additionally or alternatively, other examples of kickstand assemblies of the present disclosure can include one or more additional backplate accessory magnet(s) that are located and configured to attract one or more additional corresponding frame accessory magnet(s) in a frame of a foldable computing device. In other examples of this configuration and as described above, kickstand assemblies of the present disclosure are integrated into one of the frames of the foldable computing device (i.e., not removable).

Figure 11:
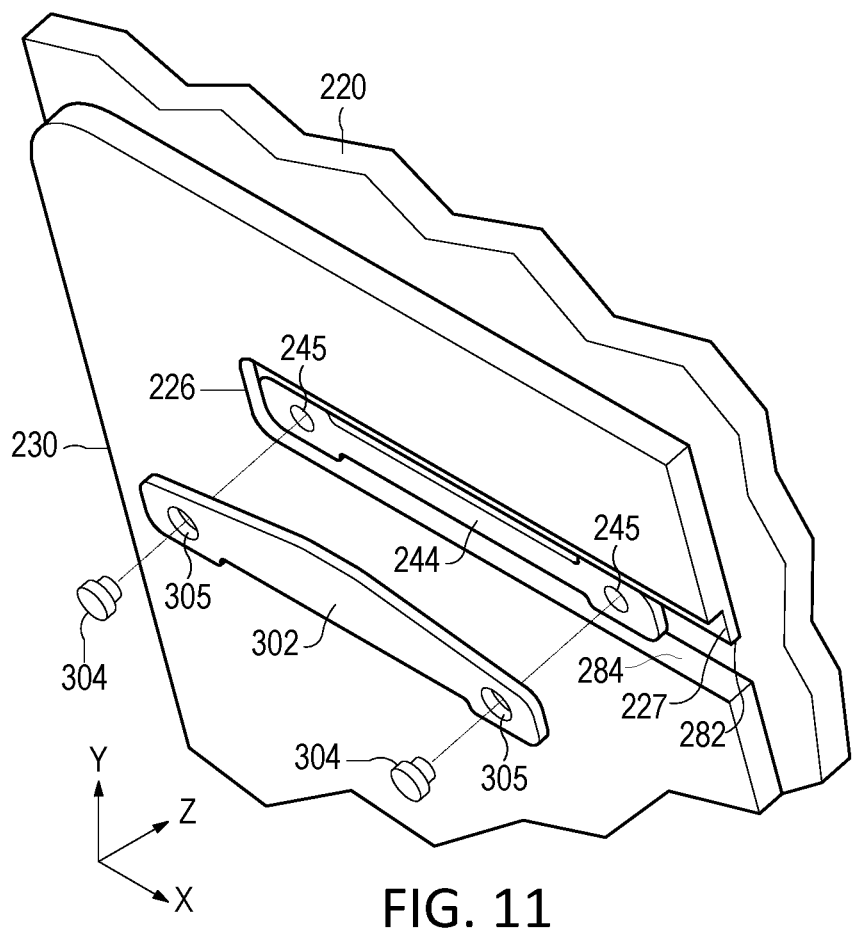
FIG. 11 shows an exploded partial view of a portion of the kickstand assembly of FIG. 10.
Figure 12:
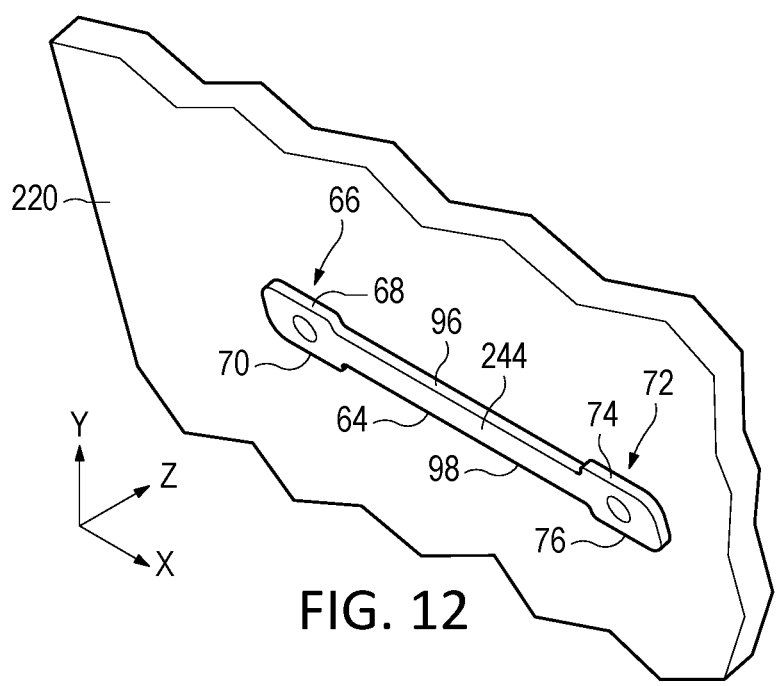
FIG. 12 shows a view of the slider and backplate of the kickstand assembly of FIG. 11.
Figure 13:
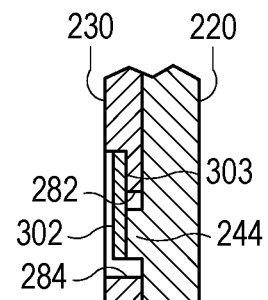
FIG. 13 shows a cross-section view taken along lines 13-13 in FIG. 9.

With reference now to FIGS. 11-13, an example structure of the first slider 244 is now provided. In the present example, the first slider 244 has the same shape and structure as the first slider 44 described above. Accordingly, reference numerals denoting the same structures are utilized. Additionally, the second slider 246 has the same shape and structure as the first slider 244.

As shown in FIG. 12, the first slider 244 comprises an elongated member 64 that comprises a first end 66 comprising a first slider upper bearing surface 68 and a first slider lower bearing surface 70, and a second end 72 comprising a second slider upper bearing surface 74 and a second slider lower bearing surface 76. Between the first slider upper bearing surface 68 and the second slider upper bearing surface 74 is an upper recessed relief surface 96. Similarly, between the first slider lower bearing surface 70 and the second slider lower bearing surface 76 is a lower recessed relief surface 97. As noted above, by spacing the upper and lower bearing surfaces between elongated recessed relief surfaces, the first slider 244 (and second slider 246) create distanced slider surface areas that contact upper and lower slot surfaces at spaced-apart locations within the slot. Advantageously, such spacings help reduce torsional forces exerted on the sliders which correspondingly reduces the potential for the sliders to bind or jam within the slots.

As best seen in FIGS. 11-13, in this example the first slider upper bearing surface 68 and the second slider upper bearing surface 74 are in sliding contact with a first slot upper bearing surface 282 of the first slot 226. In a similar manner, the first slider lower bearing surface 70 and the second slider lower bearing surface 76 are in sliding contact with a first slot lower bearing surface 284 of the first slot 226. Accordingly and like the example described above, the first slider 244, second slider 246, and upper kickstand plate 230 are constrained to translate in the x-axis direction to enable the user to easily move the kickstand assembly 200 and automatically deploy the lower kickstand plate 232 as described herein.

In other examples, the distance between the first slot upper bearing surface 282 and the first slot lower bearing surface 284 is slightly greater than the distance between the first slider upper bearing surface 68 and the first slider lower bearing surface 70, and similarly slightly greater than the distance between the second slider upper bearing surface 74 and the second slider lower bearing surface 76. In one potential advantage of these examples, the first slider 244 and second slider 246 have a slight freedom of movement in the y-axis direction to provide for reduced frictional engagement and a lower likelihood of binding in the x-axis direction.

To retain the first slider 244 within the first slot 226, a first capture member 302 is affixed to the first slider 244. In this example, pins 304 extend through apertures 305 in the first capture member 302 and into apertures 245 in the first slider 244 to retain the first slider within the first slot 226. With reference to FIGS. 11 and 13, a rear face 303 of the first capture member 302 rests against a first shelf 227 within the first slot 226. Advantageously, in this configuration the first capture member 302 retains the first slider 244 within the first slot 226, which correspondingly retains and enables the kickstand assembly 200 to translate laterally with respect to the backplate 20.

Figure 9:
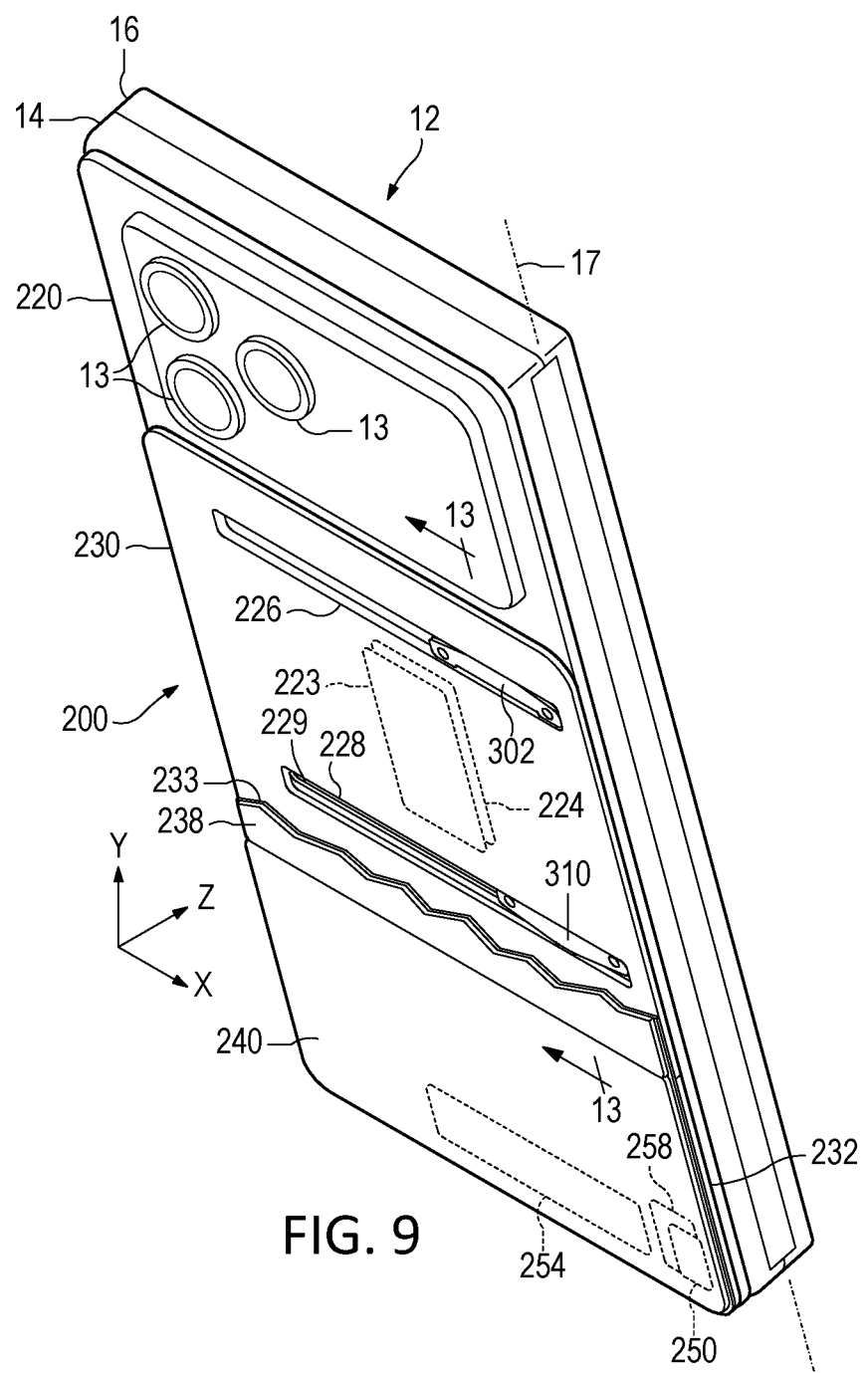
FIG. 9 shows another example of a kickstand assembly mounted to a foldable computing device according to examples of the present disclosure.
Figure 10:
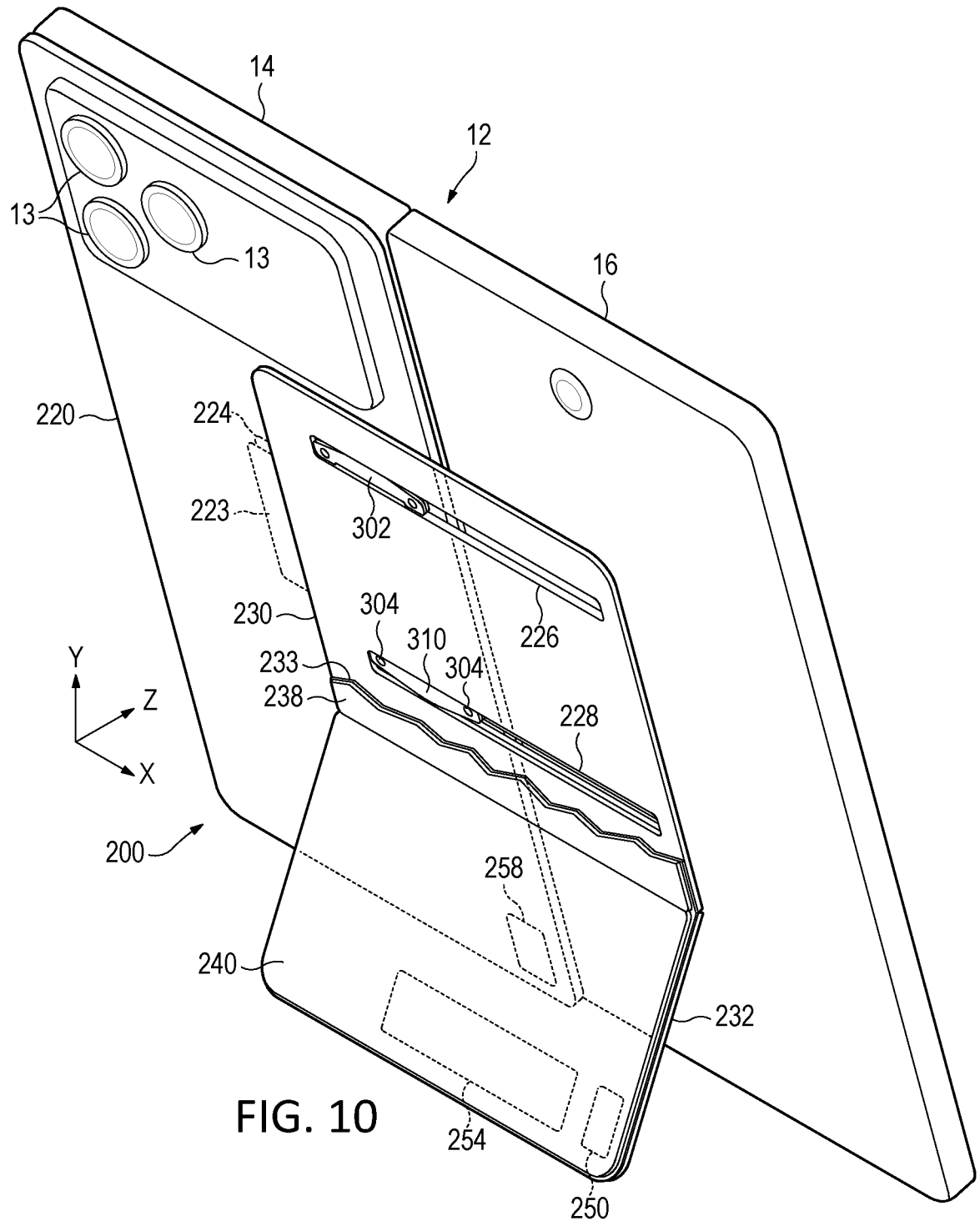
FIG. 10 shows the kickstand assembly of FIG. 9 in a deployed position.

With reference to FIGS. 9, 10, and 13, the second slider 246 is similarly retained within the second slot 228 by a second capture member 310 via pins 304. A rear face 312 of the second capture member 310 rests against a second shelf 229 within the second slot 228. As described above, the second capture member 310 retains the second slider 246 within the second slot 228, which correspondingly retains and enables the kickstand assembly 200 to translate laterally with respect to the backplate 20.

As described above, magnets automatically deploy the lower kickstand plate 232 when a user laterally slides the assembly from the home position of FIG. 9 to a deployed position as shown in FIG. 10. In this configuration, the backplate 220 includes a backplate deploy magnet 258 that has a first magnetic pole orientation. The lower kickstand plate 232 includes a closing magnet 250 that has a second magnetic pole orientation that attracts the first magnetic pole orientation of the backplate deploy magnet 258.

Accordingly, and in the same manner as described above, the closing magnet 250 of the lower kickstand plate 232 overlies and magnetically attracts the backplate deploy magnet 258 in the backplate 220 to releasably secure the lower kickstand plate to the backplate when the lower kickstand plate is in the home position relative to the backplate as shown in FIG. 9.

The lower kickstand plate 232 also includes an opening magnet 254 spaced laterally from the closing magnet 250. The opening magnet 254 has the first magnetic pole orientation of the backplate deploy magnet 258. In this manner, when the upper kickstand plate 230 is laterally translated in the positive x-axis direction relative to the backplate 220 from the home position toward the deployed position of FIG. 10, the backplate deploy magnet 258 repels the opening magnet 254 to cause the lower kickstand plate 232 to rotate about the upper kickstand plate into the angled, deployed position as shown in FIG. 10.

Accordingly, and in another potential advantage of the present disclosure, this configuration automatically deploys the lower kickstand plate 232 when the upper kickstand plate 230 is laterally translated away from the home position in the positive x-axis direction. It follows that this configuration both automatically deploys the lower kickstand plate 232 and repositions the kickstand plate to a position more aligned with the center of gravity of the two frames in the end-to-end orientation, thereby providing a more stable and secure angled positioning of the foldable computing device 12.

Figure 14:
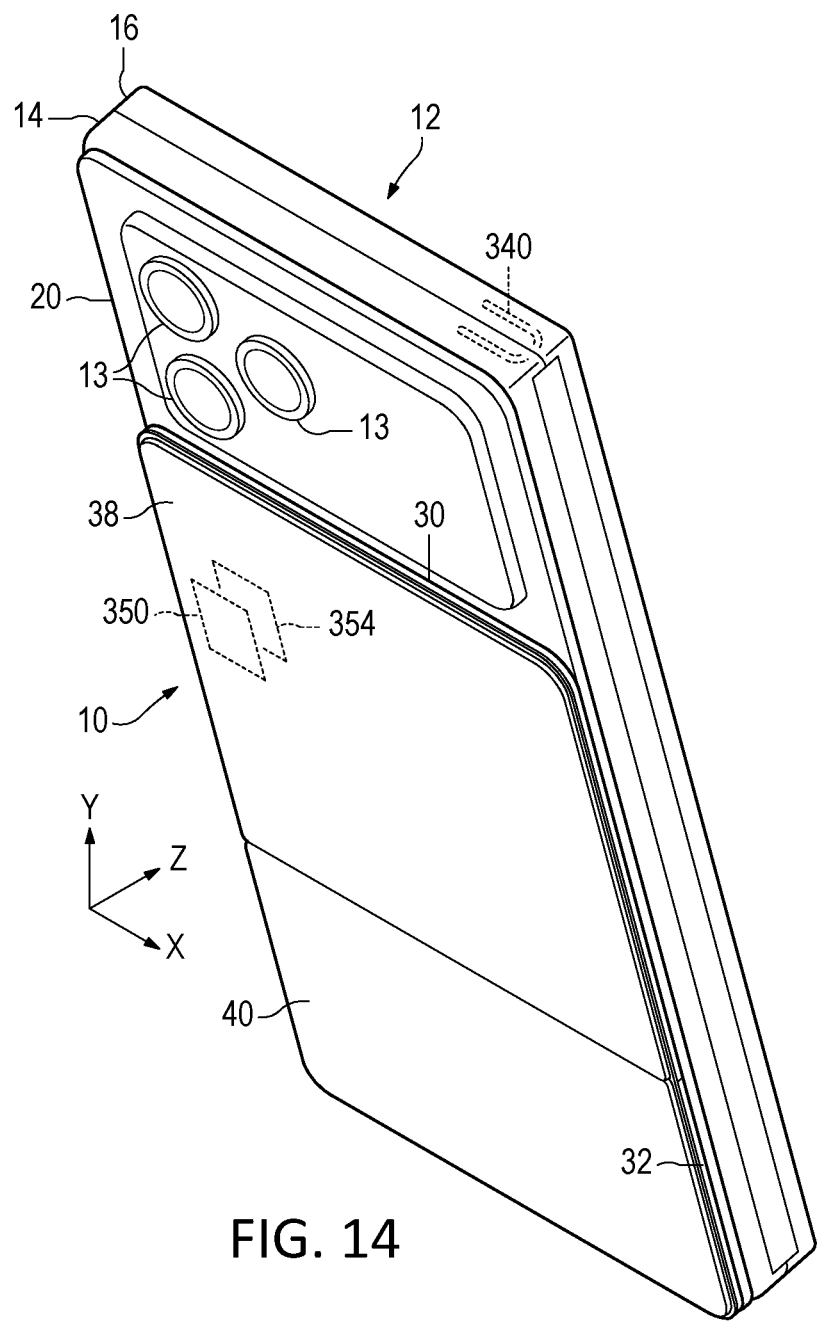
FIG. 14 shows another example of a kickstand assembly according to examples of the present disclosure.
Figure 15:
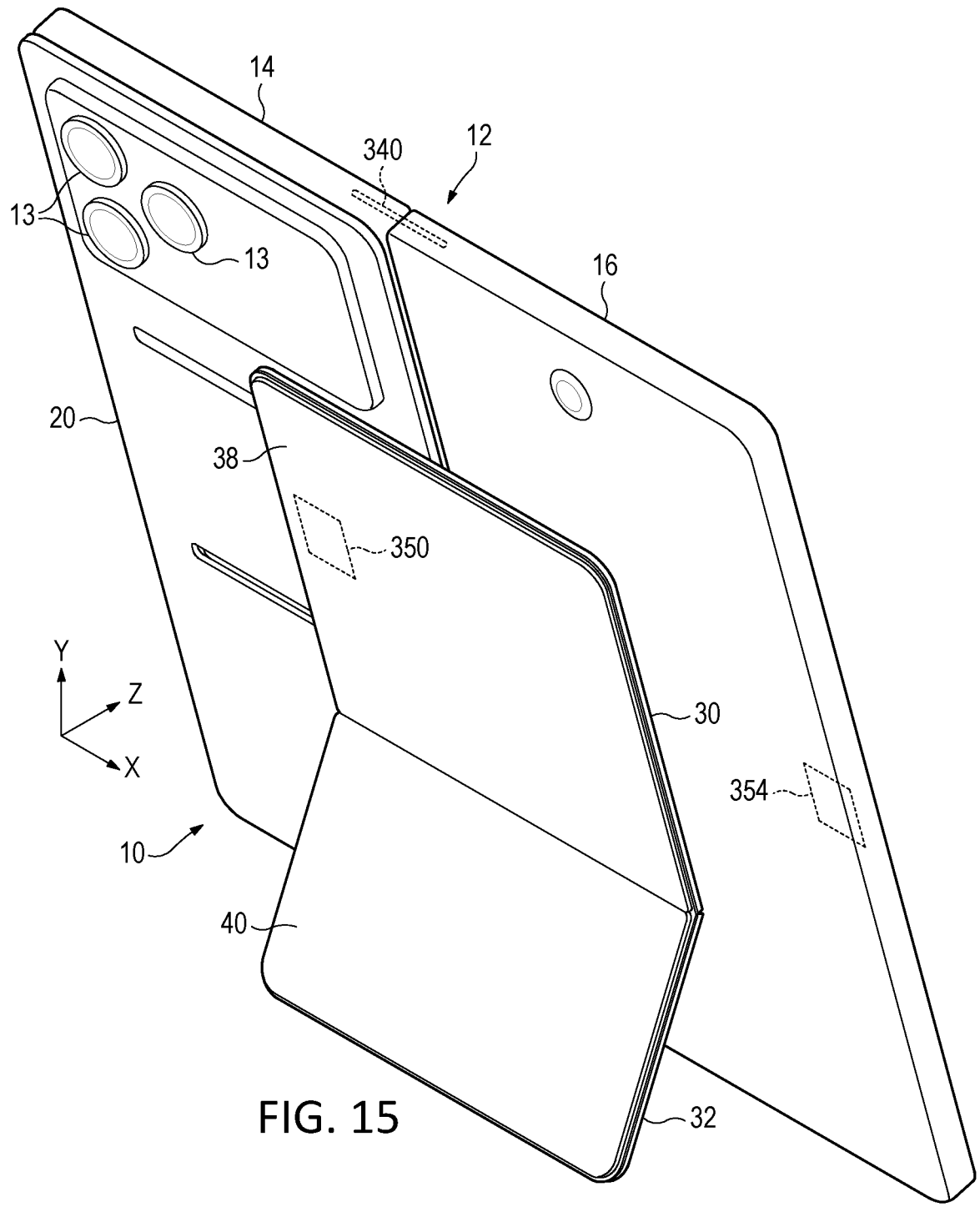
FIG. 15 shows the kickstand assembly of FIG. 14 in a deployed position.

With reference now to FIGS. 14-15, in some examples kickstand assemblies of the present disclosure are also configured to magnetically assist with opening and closing of the foldable computing device 12. In the example of FIG. 14, the upper kickstand plate 30 of the kickstand assembly 10 includes a kickstand retention magnet 350 having a kickstand magnetic pole orientation. When the upper kickstand plate 30 is in the home position relative to the backplate 20 and the first frame 14 and the second frame 16 are in a closed orientation as shown in FIG. 14, the kickstand retention magnet 350 overlies a frame retention magnet 354 in the second frame of the foldable computing device 12. The frame retention magnet 354 has a frame magnetic pole orientation that attracts the kickstand magnetic pole orientation of the kickstand retention magnet 350. Accordingly, and in one potential advantage of this configuration, the frame retention magnet 354 removably retains the second frame 16 of the foldable computing device 12 against the first frame 14 in the closed orientation as shown in FIG. 14.

Additionally, in this example the foldable computing device 12 includes a biaser that biases the first frame 14 and the second frame 16 to rotate open from the closed orientation. In the present example, the biaser comprises a leaf spring 340 that extends between the first frame 14 and the second frame 16. In other examples, a wide variety of biasing components may be utilized to bias the first frame 14 and the second frame 16, such as coil springs, elastomeric members, magnets, etc. When the first frame 14 and the second frame 16 are in the closed orientation of FIG. 14, the frame retention magnet 354 and kickstand retention magnet 350 cooperate to keep the two frames closed by overcoming the torsional force created by leaf spring 340 tending to open the two frames.

With reference to FIG. 15, when the upper kickstand plate 30 is laterally translated in the x-axis direction, the kickstand retention magnet 350 is moved away from overlying the frame retention magnet 354, thereby enabling the leaf spring 340 to begin separating and opening the first frame 14 and second frame 16 from the closed orientation. Advantageously in this example, translating the upper kickstand plate 30 in the x-axis direction relative to the backplate 20 automatically opens the two frames from the closed orientation in addition to repositioning and automatically deploying the lower kickstand plate 32 as described above.

Figure 16:
FIG. 16 shows a flow diagram of a method of deploying a lower kickstand plate of a kickstand assembly that is attached to a foldable computing according to examples of the present disclosure.

With reference now to FIG. 16, a flow diagram is provided depicting an example method 400 of deploying a lower kickstand plate of a kickstand assembly that is attached to a foldable computing. The following description of method 400 is provided with reference to the components described herein and shown in FIGS. 1-15. In some examples, the method 400 is performed with the kickstand assembly 10 at the foldable computing devices 12 of FIGS. 1-8 and 14-15 as described herein. In other examples, the method 400 is performed with the kickstand assembly 200 at the foldable computing device 12 of FIGS. 9-13 as described herein. In other examples, the method 400 is performed in other contexts using other suitable components.

At 402, the method 400 includes sliding an upper kickstand plate of the kickstand assembly in a lateral direction relative to the backplate to cause a backplate deploy magnet in the backplate to repel an opening magnet in the lower kickstand plate and cause the lower kickstand plate to rotate about a connection with the upper kickstand plate. Advantageously and as described above, the method 400 automatically deploys and repositions the lower kickstand plate to a location more aligned with the center of gravity of two frames of the foldable computing device in an end-to-end orientation, thereby providing a more stable and secure angled positioning of the foldable computing device.

The following paragraphs provide additional support for the claims of the subject application. One aspect provides a kickstand assembly for a foldable computing device, the kickstand assembly comprising: a backplate comprising a backplate deploy magnet having a first magnetic pole orientation; an upper kickstand plate slidably connected to the backplate; and a lower kickstand plate rotatably coupled to the upper kickstand plate and comprising: a closing magnet having a second magnetic pole orientation that attracts the first magnetic pole orientation of the backplate deploy magnet; and an opening magnet laterally spaced from the closing magnet and having the first magnetic pole orientation that repels the backplate deploy magnet to cause the lower kickstand plate to rotate about the upper kickstand plate when the upper kickstand plate is laterally translated relative to the backplate. The kickstand assembly may additionally or alternatively include, wherein the backplate is a separate structure that is removably attached to the foldable computing device. The kickstand assembly may additionally or alternatively include, wherein the backplate comprises a backplate accessory magnet configured to attract a frame accessory magnet in a frame of the foldable computing device to removably attach the kickstand assembly to the frame. The kickstand assembly may additionally or alternatively include, wherein the backplate is also a rear face of a frame of the foldable computing device.

The kickstand assembly may additionally or alternatively include, wherein the closing magnet of the lower kickstand plate overlies the backplate deploy magnet and releasably secures the lower kickstand plate to the backplate when the lower kickstand plate is in a home position relative to the backplate. The kickstand assembly may additionally or alternatively include, wherein the foldable computing device comprises a first frame rotatably coupled to a second frame, and wherein the upper kickstand plate further comprises a kickstand retention magnet having a kickstand magnetic pole orientation, and the kickstand retention magnet overlies a frame retention magnet in the second frame of the foldable computing device when the upper kickstand plate is in a home position and the first frame and the second frame are in a closed orientation, wherein the frame retention magnet has a frame magnetic pole orientation that attracts the kickstand magnetic pole orientation of the kickstand retention magnet to removably retain the second frame against the first frame in the closed orientation. The kickstand assembly may additionally or alternatively include, wherein the foldable computing device comprises a biaser that biases the first frame and the second frame to rotate open from the closed orientation, and wherein the biaser opens the first frame and the second frame from the closed orientation when the upper kickstand plate is laterally translated relative to the backplate to move the kickstand retention magnet away from overlying the frame retention magnet. The kickstand assembly may additionally or alternatively include, wherein the backplate comprises a plurality of slots, and the upper kickstand plate comprises a plurality of sliders that are each slidably received in one slot of the plurality of slots in the backplate. The kickstand assembly may additionally or alternatively include, wherein the sliders are integrally fabricated with the upper kickstand plate.

The kickstand assembly may additionally or alternatively include, wherein the sliders are separate components that are affixed to the upper kickstand plate. The kickstand assembly may additionally or alternatively include, wherein each of the sliders comprises an elongated member that comprises: a first end comprising a first slider upper bearing surface and a first slider lower bearing surface; and a second end comprising a second slider upper bearing surface and a second slider lower bearing surface. The kickstand assembly may additionally or alternatively include, wherein each of the sliders further comprises a recessed relief surface between the first end and the second end. The kickstand assembly may additionally or alternatively include a plurality of capture members, wherein each of the capture members is affixed to one of the sliders to retain the slider within the corresponding slot. The kickstand assembly may additionally or alternatively include, wherein the backplate comprises a plurality of sliders and the upper kickstand plate comprises a plurality of slots, wherein each of the sliders is slidably received in one slot of the plurality of slots. The kickstand assembly may additionally or alternatively include, wherein the sliders are integrally fabricated with the backplate. The kickstand assembly may additionally or alternatively include, wherein the sliders are separate components that are affixed to the backplate.

The kickstand assembly may additionally or alternatively include, wherein the backplate is a separate structure that is removably attached to the foldable computing device. The kickstand assembly may additionally or alternatively include, wherein each of the sliders comprises an elongated member that comprises: a first end comprising a first slider upper bearing surface and a first slider lower bearing surface; and a second end comprising a second slider upper bearing surface and a second slider lower bearing surface.

Another aspect provides kickstand assembly for a foldable computing device, the kickstand assembly comprising: a backplate comprising: a plurality of slots; a backplate deploy magnet having a first magnetic pole orientation; and a backplate accessory magnet configured to attract a frame accessory magnet in a frame of the foldable computing device to removably attach the kickstand assembly to the frame; an upper kickstand plate comprising a plurality of sliders that are each slidably received in one slot of the plurality of slots in the backplate; and a lower kickstand plate rotatably coupled to the upper kickstand plate and comprising: a closing magnet having a second magnetic pole orientation that attracts the first magnetic pole orientation of the backplate deploy magnet; and an opening magnet laterally spaced from the closing magnet and having the first magnetic pole orientation that repels the backplate deploy magnet to cause the lower kickstand plate to rotate about the upper kickstand plate when the upper kickstand plate is laterally translated relative to the backplate.

Another aspect provides a method of deploying a lower kickstand plate of a kickstand assembly that is attached to a foldable computing, the method comprising: sliding an upper kickstand plate of the kickstand assembly in a lateral direction relative to the backplate to cause a backplate deploy magnet in the backplate to repel an opening magnet in the lower kickstand plate and cause the lower kickstand plate to rotate about a connection with the upper kickstand plate.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A kickstand assembly for a foldable computing device, the kickstand assembly comprising:
   a backplate comprising a backplate deploy magnet having a first magnetic pole orientation;
   an upper kickstand plate slidably connected to the backplate; and
   a lower kickstand plate rotatably coupled to the upper kickstand plate and comprising:
      a closing magnet having a second magnetic pole orientation that attracts the first magnetic pole orientation of the backplate deploy magnet; and
      an opening magnet laterally spaced from the closing magnet and having the first magnetic pole orientation that repels the backplate deploy magnet to cause the lower kickstand plate to rotate about the upper kickstand plate when the upper kickstand plate is laterally translated relative to the backplate.

2. The kickstand assembly of claim 1, wherein the backplate is a separate structure that is removably attached to the foldable computing device.

3. The kickstand assembly of claim 2, wherein the backplate comprises a backplate accessory magnet configured to attract a frame accessory magnet in a frame of the foldable computing device to removably attach the kickstand assembly to the frame.

4. The kickstand assembly of claim 1, wherein the backplate is also a rear face of a frame of the foldable computing device.

5. The kickstand assembly of claim 1, wherein the closing magnet of the lower kickstand plate overlies the backplate deploy magnet and releasably secures the lower kickstand plate to the backplate when the lower kickstand plate is in a home position relative to the backplate.

6. The kickstand assembly of claim 1, wherein the foldable computing device comprises a first frame rotatably coupled to a second frame, and wherein the upper kickstand plate further comprises a kickstand retention magnet having a kickstand magnetic pole orientation, and the kickstand retention magnet overlies a frame retention magnet in the second frame of the foldable computing device when the upper kickstand plate is in a home position and the first frame and the second frame are in a closed orientation, wherein the frame retention magnet has a frame magnetic pole orientation that attracts the kickstand magnetic pole orientation of the kickstand retention magnet to removably retain the second frame against the first frame in the closed orientation.

7. The kickstand assembly of claim 6, wherein the foldable computing device comprises a biaser that biases the first frame and the second frame to rotate open from the closed orientation, and wherein the biaser opens the first frame and the second frame from the closed orientation when the upper kickstand plate is laterally translated relative to the backplate to move the kickstand retention magnet away from overlying the frame retention magnet.

8. The kickstand assembly of claim 1, wherein the backplate comprises a plurality of slots, and the upper kickstand plate comprises a plurality of sliders that are each slidably received in one slot of the plurality of slots in the backplate.

9. The kickstand assembly of claim 8, wherein the sliders are integrally fabricated with the upper kickstand plate.

10. The kickstand assembly of claim 8, wherein the sliders are separate components that are affixed to the upper kickstand plate.

11. The kickstand assembly of claim 8, wherein each of the sliders comprises an elongated member that comprises:
a first end comprising a first slider upper bearing surface and a first slider lower bearing surface; and
a second end comprising a second slider upper bearing surface and a second slider lower bearing surface.

12. The kickstand assembly of claim 11, wherein each of the sliders further comprises a recessed relief surface between the first end and the second end.

13. The kickstand assembly of claim 11, further comprising a plurality of capture members, wherein each of the capture members is affixed to one of the sliders to retain the slider within the corresponding slot.

14. The kickstand assembly of claim 1, wherein the backplate comprises a plurality of sliders and the upper kickstand plate comprises a plurality of slots, wherein each of the sliders is slidably received in one slot of the plurality of slots.

15. The kickstand assembly of claim 14, wherein the sliders are integrally fabricated with the backplate.

16. The kickstand assembly of claim 14, wherein the sliders are separate components that are affixed to the backplate.

17. The kickstand assembly of claim 14, wherein the backplate is a separate structure that is removably attached to the foldable computing device.

18. The kickstand assembly of claim 14, wherein each of the sliders comprises an elongated member that comprises:
a first end comprising a first slider upper bearing surface and a first slider lower bearing surface; and
a second end comprising a second slider upper bearing surface and a second slider lower bearing surface.

19. A kickstand assembly for a foldable computing device, the kickstand assembly comprising:
a backplate comprising:
a plurality of slots;
a backplate deploy magnet having a first magnetic pole orientation; and
a backplate accessory magnet configured to attract a frame accessory magnet in a frame of the foldable computing device to removably attach the kickstand assembly to the frame;
an upper kickstand plate comprising a plurality of sliders that are each slidably received in one slot of the plurality of slots in the backplate; and
a lower kickstand plate rotatably coupled to the upper kickstand plate and comprising:
a closing magnet having a second magnetic pole orientation that attracts the first magnetic pole orientation of the backplate deploy magnet; and
an opening magnet laterally spaced from the closing magnet and having the first magnetic pole orientation that repels the backplate deploy magnet to cause the lower kickstand plate to rotate about the upper kickstand plate when the upper kickstand plate is laterally translated relative to the backplate.

20. A method of deploying a lower kickstand plate of a kickstand assembly that is attached to a foldable computing, the method comprising:
sliding an upper kickstand plate of the kickstand assembly in a lateral direction relative to the backplate to cause a backplate deploy magnet in the backplate to repel an opening magnet in the lower kickstand plate and cause the lower kickstand plate to rotate about a connection with the upper kickstand plate.

* * * * *